United States Patent
Zukerman et al.

(10) Patent No.: US 9,563,695 B2
(45) Date of Patent: Feb. 7, 2017

(54) PERSONALIZED ELECTRONIC MAGAZINE

(71) Applicant: Google Inc., Mountain View, CA (US)

(72) Inventors: Jokubas Zukerman, San Francisco, CA (US); Sami Mohammed Shalabi, Lexington, MA (US); Maurice Shore, Carlisle, MA (US); Mehul Agarwal, Boston, MA (US); Imad Jureidini, Arlington, MA (US)

(73) Assignee: Google Inc., Mountain View, CA (US)

( * ) Notice: Subject to any disclaimer, the term of this patent is extended or adjusted under 35 U.S.C. 154(b) by 170 days.

(21) Appl. No.: 14/141,062

(22) Filed: Dec. 26, 2013

(65) Prior Publication Data
US 2015/0186491 A1 Jul. 2, 2015

(51) Int. Cl.
*G06F 17/30* (2006.01)
(52) U.S. Cl.
CPC .................. *G06F 17/30702* (2013.01)
(58) Field of Classification Search
CPC ............. G06F 17/30247; G06F 17/30253; G06F 17/30256; G06F 17/30386; G06F 19/3462; G06F 3/0686; G06F 17/30011; G06F 17/30613
See application file for complete search history.

(56) References Cited

U.S. PATENT DOCUMENTS

| | | | |
|---|---|---|---|
| 2009/0228774 A1* | 9/2009 | Matheny | G06F 17/30873 715/201 |
| 2010/0205541 A1* | 8/2010 | Rapaport | G06Q 10/10 715/753 |
| 2012/0209907 A1* | 8/2012 | Andrews | G06F 17/30867 709/204 |
| 2013/0073387 A1* | 3/2013 | Heath | G06Q 50/01 705/14.53 |
| 2013/0159506 A1* | 6/2013 | Stern | G06F 17/30 709/224 |

* cited by examiner

*Primary Examiner* — Angelica Ruiz
(74) *Attorney, Agent, or Firm* — Fenwick & West LLP (57) ABSTRACT

An personalized electronic magazine system includes an indexing module that stores topics related to various items available via a database. A user profile manager determines topics of interest to a particular user, and a recommendation generator uses the topic information from the indexing module and the topic information from the profile manager to generate recommended content to present to the user.

21 Claims, 10 Drawing Sheets

ID
PERSONALIZED ELECTRONIC MAGAZINE

BACKGROUND

1. Technical Field

The subject matter described herein generally relates to the field of electronic media and, more particularly, to systems and methods for determining content suitable for inclusion in a personalized electronic magazine.

2. Background Information

Electronic readers, implemented on special-purpose devices as well as on conventional desktop, laptop and hand-held computers, have become commonplace. Usage of such readers has accelerated dramatically in recent years. Electronic readers provide the convenience of having numerous books, magazines, videos, journals, blogs and the like available on a single device, and also allow different devices to be used for reading (or viewing/listening) in different situations.

Given the proliferation of content that could be placed in an electronic magazine, and the lack of physical limitations such as printing costs, it is tempting for a user to over-subscribe to sources of information. Likewise, vendors of known electronic magazines have often allowed users to select too many topics to provide a reasonable user experience, and sometimes have automatically populated such electronic magazines with far more information than could reasonably be enjoyably digested by a user. Much of the information provided does not actually meet the user's interests or needs, and merely tends to overwhelm the user.

It would be advantageous to extend the benefits of electronic magazine technology further, for instance to automatically determine content most likely to be of interest to a reader, and to arrange it in a manner that provides efficient access.

SUMMARY

An electronic magazine system includes an indexing module that assigns topics to available content, a user profile manager that determines profile topics that a particular user finds interesting, and a user recommendation generator that selects content for the user based on the operation of the indexing module and the user profile manager.

In one aspect, the indexing module includes a row filtering subsystem to manage how many of the content items are identified as corresponding to each of the available topics.

In another aspect, the user recommendation generator includes a mixer to ensure that the magazine items are selected so as to provide sufficient representation of each of the profile topics.

In still another aspect, the user profile manager performs decay processing to remove stale topics from the profile topics. In related aspects, the user profile manager maintains multiple profiles for the user.

Related methods and computer-readable storage media storing corresponding program code are also disclosed herein.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Electronic Magazine System Overview

Figure 1:
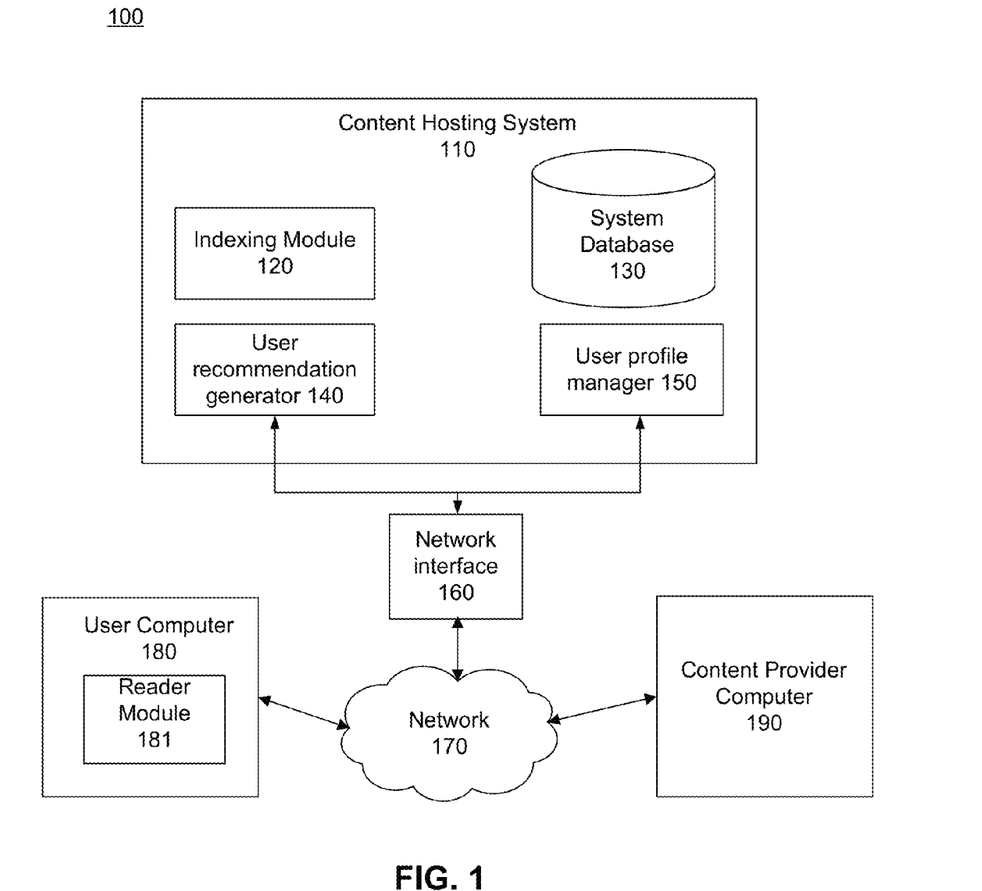
FIG. 1 is a high-level diagram illustrating a networked environment that includes an indexing module.

FIG. 1 is a high-level diagram illustrating an electronic magazine system 100 that includes a content hosting system 110. The content hosting system 110 makes available for purchase, licensing, rental or other paid/free subscription text articles, images, audio files, videos and other content that can be presented on user computer 180 using a reader module 181, which may be implemented in some embodiments as a standalone application and in other embodiments as a browser service or via another implementation appropriate for the operating environment of user computer 180. A content provider computer 190 is used to provide the content ultimately delivered to user computer 180. The content hosting system 110 and computers 180, 190 are connected by a network 170 such as a local area network or the Internet.

The network 170 is typically the Internet, but can be any network, including but not limited to any combination of a LAN, a MAN, a WAN, a mobile, a wired or wireless network, a private network, or a virtual private network. The content hosting system 110 is connected to the network 170 through a network interface 160.

Only a single user computer 180 is shown in FIG. 1, but in practice there are many (e.g., millions of) user computers 180 that can communicate with and use content hosting system 110. Similarly, only a single content provider computer 190 is shown, but in practice there are many (e.g., thousands or even millions of) content provider computers 190 that can provide articles and related materials for content hosting system 110. In some embodiments, reader module 181 includes a content player (e.g., FLASH™ from Adobe Systems, Inc.), or any other player adapted for the content file formats used by the content hosting system 110. In a typical embodiment, user computer 180 and content provider computer 190 are implemented with various computing devices, ranging from desktop personal computers to tablet computers, dedicated book reader devices, and smartphones.

User computer 180 with reader module 181 is used by end users to purchase or otherwise obtain, and access, materials provided by the content hosting system 110. Content provider computer 190 is used by content providers (e.g., individual authors, publishing houses) to create and provide material for the content hosting system 110. A given computer can be both a client computer 180 and content provider computer 190, depending on its usage. The hosting system 110 may differentiate between content providers and users in this instance based on user logon information or other factors.

The content hosting system 110 comprises a user recommendation generator 140 and a user profile manager 150, each of which can be implemented as one or more server class computers. The user profile manager 150 processes information particular to the user, as detailed below, to obtain and store user characteristics relevant to what content may be appropriate for that user. Likewise, user recommendation generator 140 provides processing to determine what material made available by content providers is most appropriate to be presented to user computer 180, as detailed below. In some embodiments, connections from network 170 to other devices (e.g., user computer 180) are persistent, while in other cases they are not, and information such as a user preference selection is transmitted to other components of system 110 only episodically (i.e., when connections are active). Indexing module 120 is used, as detailed below, to create a collection of content relevant for each of many different topics. User recommendation generator 140 will generate specific content for user computer 180 based on the contents of indexing module 120 and operation of user profile manager 150.

In situations in which the systems or components discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Content hosting system 110 is implemented by a network of server class computers that can in some embodiments include one or more high-performance CPUs and one gigabyte or more of main memory, as well as storage ranging from hundreds of gigabytes to petabytes. An operating system such as LINUX is typically used. The operations of the content hosting system 110 and its constituent components as described herein can be controlled through either hardware (e.g., dedicated computing devices or daughterboards in general purpose computers), or through computer programs installed in computer storage on the servers of the system 110 and executed by the processors of such servers to perform the functions described herein. More detail regarding implementation of such machines is provided in connection with FIG. 4. One of skill in the art of system engineering and, for example, media content hosting will readily determine from the functional and algorithmic descriptions herein the construction and operation of such computer programs and hardware systems.

The content hosting system 110 further comprises a system database 130 that is communicatively coupled to the network 170. The system database 130 stores data related to the content hosting system 110 along with user and system usage information and, in some embodiments, provides related processing.

The system database 130 can be implemented as any device or combination of devices capable of storing data in computer readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the descriptions set forth above.

Figure 4:
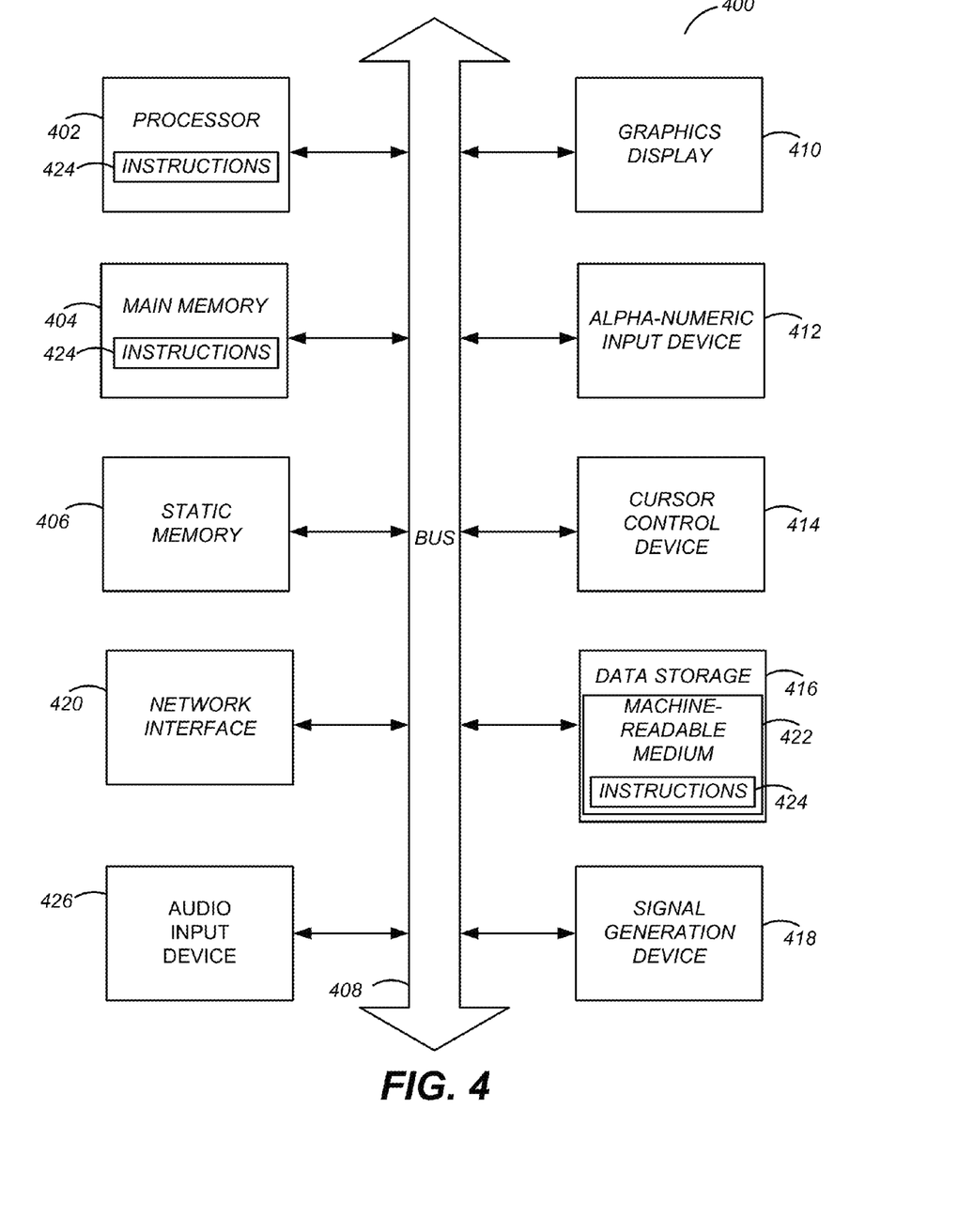
FIG. 4 illustrates one embodiment of components of an example machine able to read instructions from a machine-readable medium and execute them in a processor.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors included as part of the content hosting system 110. Alternatively, hardware or software modules may be stored elsewhere within the content hosting system 110. The content hosting system 110 includes hardware elements necessary for the operations described here, including one or more processors, high speed memory, hard disk storage and backup, network interfaces and protocols, input devices for data entry, and output devices for display, printing, or other presentations of data. FIG. 4 provides further details regarding such components.

Numerous variations from the system architecture of the illustrated content hosting system 110 are possible. The components of the system 110 and their respective functionalities can be combined or redistributed. For example, the system database 130, indexing module 120, user recommendation generator 140, and user profile manager 150 can be distributed among any number of devices. The following sections describe in greater detail the indexing module 120, system database 130, and the other components illustrated in FIG. 1, and explain their operation in the context of the content hosting system 110.

Indexing Module

Figure 2A:
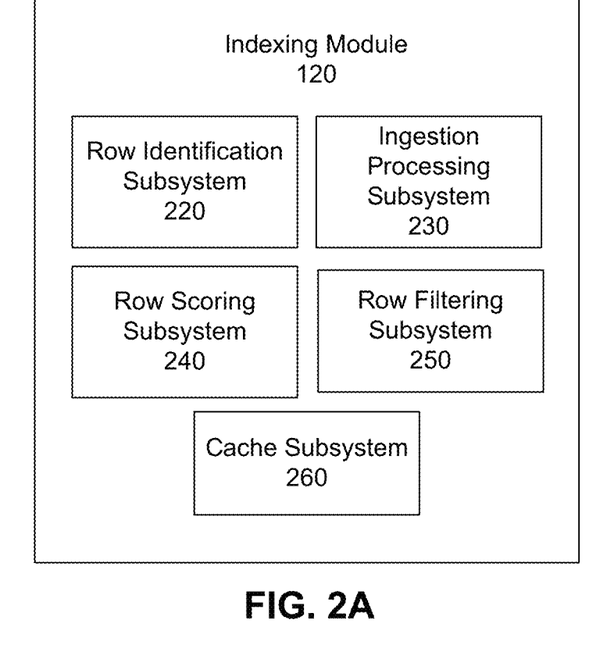
FIG. 2A illustrates a logical view of an indexing module used as part of an electronic book reader.

FIG. 2A illustrates a functional view of an indexing module 120 used as part of an electronic magazine system 100. In the embodiment described above in connection with FIG. 1, the indexing module 120 is implemented on content hosting system 110, but it should be recognized that in other embodiments, portions discussed herein could also be implemented on other computers (e.g., user computer 180A) that are in communication with content hosting system 110.

Indexing module 120 is configured, in the aspects discussed herein, to create a collection of content that is relevant to each of a set of topics. Indexing module 120 includes various subsystems to facilitate its operation. In the embodiment illustrated in FIG. 2A, indexing module 120 includes a row identification subsystem 220, an ingestion processing subsystem 230, a row scoring subsystem 240, a row filtering subsystem 250, and a cache subsystem 260. Many of these subsystems interact with one another, as described below.

Row identification subsystem 220 provides a mechanism for identifying topics to be tracked by the index. In practice, topics can be any form of structured metadata, such as a place, person, thing, event or time. In one embodiment, topics are identified using the Google Knowledge Graph database of topics. This database includes a very large collection of known topics, as well as connections between topics based on their relevance to one another. In other embodiments, other collections of topics can be used as most appropriate for the operating environment.

In one embodiment, ingestion processing subsystem 220 is configured to accept any new item of content (e.g., a news article) provided by content provider computer 190, and annotate such item with topics. For example, if the word "United" appears multiple times in connection with terms relating air travel in the new item, the topic of "United Airlines" or "UAL" is annotated to the item. If, instead, the word "United" appears multiple times in connection with terms relating to trucking or moving companies, the topic of "United Van Lines" is annotated to the item. In some embodiments, weighting is associated with each such annotation. For instance, for one item it might be very clear that United Airlines was intended rather than United Van Lines, while in other instances it may be somewhat ambiguous which company topic corresponds to the item. In some embodiments, ingestion processing system 220 processes millions of new items every day, and is also implemented using portions of the aforementioned Google Knowledge Graph facility.

In such embodiments, two steps are used to find the most relevant topics for an item. The first step involves finding every topic that is actually mentioned in the item. For example, the word "United" is exactly the same as at least two known topics, based on the discussion above, so those topics are considered candidates and, based on other terms in the item (e.g., "passengers" and O'Hare) the Knowledge Graph facility selects one and gives it a weight, for instance based on how often that topic appears in the item. The second step looks for relevant topics that are not expressly mentioned in the item and also rescores topics based on relation to other topics. For instance, if a news article discusses issues confronting major airlines but fails to mention one of those airlines, the topic corresponding to that missing airline may nonetheless be added. Similar processing is used for the rescoring—if the only topics identified with regard to the news article are very closely related topics, the weight of each of those topics may be increased. In other embodiments, different weighting schemes are used as appropriate for the specific application.

Ingestion processing subsystem 230 then annotates the new item with the weighted topics, and the new item is added to the row corresponding to each of those topics.

In order to maintain reasonably low processing overhead, once topics are identified for a new item, row scoring subsystem 240 processes each impacted row by modifying the items associated with that row based on a scoring system. Low scoring items are removed from the row. This is done to ensure that each row has a relatively small number of items associated with it, and that each such item is of high quality and fairly relevant. For instance, the age of an item is used in one embodiment as a scoring parameter such that if the row has a large number of new items becoming associated with it, older items are gradually removed. Other scoring factors used in various embodiments are the number and quality of image, video and audio data for each item, the number of words in text items, an indicator of the quality of the source of the item, and relevance of the item to the topic. In some embodiments, weighting functions are used to combine such scoring factors.

Likewise, row filtering subsystem 250 operates to remove items based on various factors. In one embodiment, row filtering system 250 is used to de-duplicate rows so that only one instance of very similar items is maintained in the row at a time. As an example, a company's press release is often copied by numerous content providers, so row filtering system 250 selects only one or two such items to maintain in the row.

In the environments in which some embodiments operate, the number of stored rows is quite large, with millions of topics and thus millions of rows. Cache subsystem 260 is used to provide easy and quick access to rows that are used very frequently. Those skilled in the art will recognize that conventional cache memory structures, such as storage in active memory to obviate the need for access via a conventional database storage system, can be used to implement cache subsystem 260, as appropriate for the expected size and nature of what is to be stored in cache subsystem 260.

User Recommendation Generator

Figure 2B:
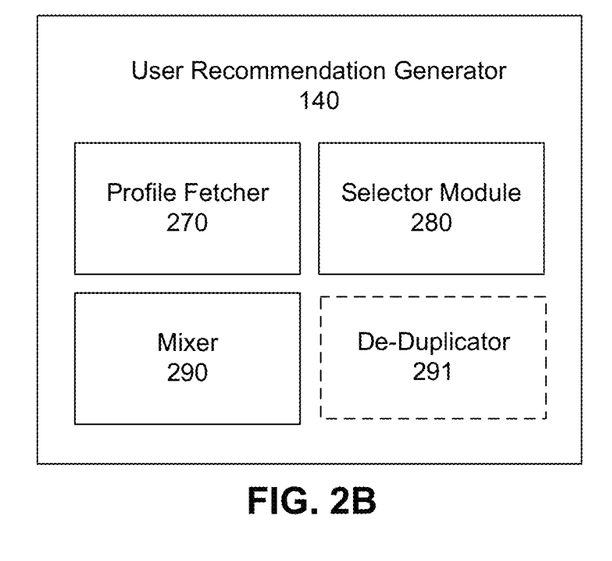
FIG. 2B illustrates a logical view of a user recommendation generator used as part of an electronic book reader.

FIG. 2B illustrates a functional view of user recommendation generator 140 used as part of system 100. In the embodiment described above in connection with FIG. 1, the user recommendation generator 140, like the indexing module 120, is implemented on content hosting system 110, but it should be recognized that in other embodiments, portions discussed herein could also be implemented on other computers (e.g., user computer 180A) that are in communication with content hosting system 110.

User recommendation generator 140 is configured, in the aspects discussed herein, to take information about a particular user and, from that information, determine what content to present to the user via user computer 180.

User recommendation generator 140 includes various subsystems to facilitate its operation. In the embodiment illustrated in FIG. 2B, the user recommendation generator 140 includes a profile fetcher 270, a selector module 280, a mixer 290, and a de-duplicator 291 (which in some embodiments may be integrated with mixer 290 and is therefore illustrated with a dashed line). Many of these subsystems interact with one another, as described below.

Profile fetcher 270 provides a mechanism for identifying topics that appear to be of interest to the individual user. In one embodiment, these topics have been stored in system database 130 (and more specifically, in user interest data store 330 discussed below in connection with FIG. 3). In some instances, such topics can be manually identified by the user while in other instances they are generated automatically as detailed herein with respect to FIG. 5. Operation of profile fetcher 270 results in provision of a list of topics with scores that show which are most interesting to the user.

Once such topics have been obtained, user recommendation generator 140 obtains corresponding content (e.g., articles or other items) using the index previously discussed. In one embodiment, this is achieved via a request to indexing module 120, while in another embodiment, a separate module (not shown in FIG. 2B) of user recommendation generator 140 is used to get the content.

The body of content thus obtained is significantly more voluminous than is desirable to present to the user. Selector module 280 scores the content according to a function appropriate for the nature of the use. In one embodiment, a pre-defined scoring function is used that includes five factors: topic relevance, content quality, edition quality, popularity, and recency. For relevance, items with more topics that overlap the user's profile get higher scores. For content quality, images that have higher resolutions (or resolutions more appropriate for the user's bandwidth) are scored higher; audio with characteristics more appropriate for the user (e.g., higher sampling rate for one user, lower file size for another user) are scored higher; text with word counts or reading levels most appropriate for the reader (e.g., based on self-identified or automatically determined historical preferences). For edition quality, content from editions previously determined to be "good" are scored above others. For popularity, content read by more users (in some embodiments, specifically more users with characteristics similar to those of the current user) is scored higher than other content. For recency, content that was published more recently gets a higher score. Once all of the items are scored, they are sorted according to their score.

In some embodiments, other algorithms are also used to pull content in from other sources. For example, a separate algorithm is used in some embodiments to get additional items from sources the user frequently reads/watches/listens to, or to get articles about topics that the user has most recently shown interest in. Those skilled in the art will recognize that for large amounts of content, server class computers are used to make multiple requests for content in parallel, and other known techniques are used so that the processing described herein is completed quickly and efficiently.

Mixer 290 then combines results from operation of the selector module 280 to create a personalized edition of various items to be presented to user computer 180. In one embodiment, mixer 290 is expressly constrained to include a fixed number of sets of items, each of which is drawn from the items obtained by selector module 280. For example, one personalized edition may be configured to include two articles from sources that the user reads frequently, two articles from topics that the user reads most frequently, two articles recommended to the user (i.e., obtained by selector module 280 but NOT satisfying the criteria of either of the first two sets), and one article from a source that is "featured" e.g., by the proprietor of content hosting system 110, for the user's home country.

In some instances, operation of the mixer as described above may generate articles for one set that are highly similar to articles of another set. Therefore, a de-duplicator module 291 (shown in dashed lines to indicate that it may not actually be a separate module, but may be implemented in an integrated manner with mixer 290) analyzes the selected items to determine whether they are highly similar. In one embodiment, de-duplicator module 291 compares topics in each article identified as a candidate for a set with all other articles already selected by generating a similarity score. Those skilled in the art will recognize that machine learning algorithms such as cosine similarity can readily be applied to generate such a similarity score. Depending on the diversity of information that is desired, a threshold of similarity score is applied to reject a proposed new article based on such similarity.

In another embodiment, de-duplicator module 291 is not applied until all sets have been populated. In this instance, if too much similarity is detected, than one of the items contributing to the over-threshold similarity score is rejected, mixer 290 chooses an alternate item, and de-duplication module 291 is iteratively operated until such time as no similarity threshold is exceeded.

As previously stated, some environments will involve millions of items of content, and system 100 will be operated for millions of users, so scalability of processing may become important in such environments. Where this is an issue, known scaling techniques such as pre-computation and storage of results are applied to speed up processing and minimize processor and memory requirements.

Those skilled in the art will also recognize that many variations from the specific subsystems, modules and operations described herein may be used as appropriate for different environments of use. For instance, where different requests often yield similar articles, rather than having servers make each request for content separately, the requests can be combined into a single fetch of content.

System Database

Figure 3:
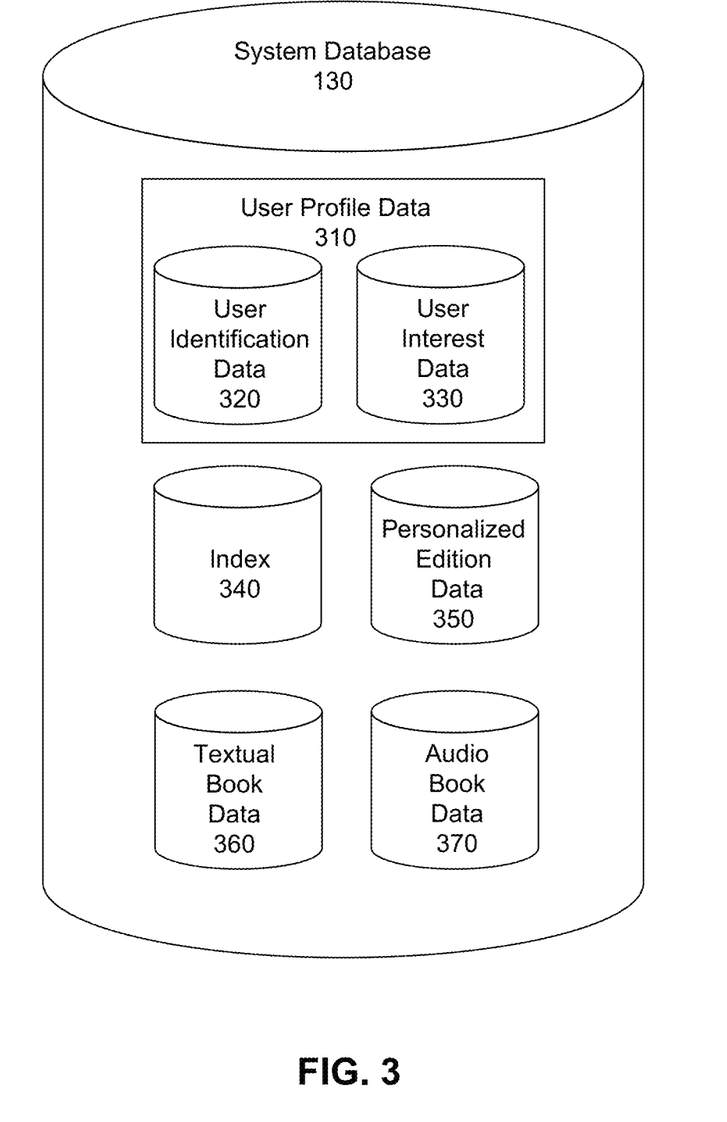
FIG. 3 illustrates a logical view of a system database that stores data and performs processing related to the operation of the indexing module.

FIG. 3 illustrates a functional view of the system database 130 that stores data related to the content hosting system 110. System database 130 may be divided based on the different types of data stored within. This data may reside in separate physical devices, or may be collected within a single physical device. System database 130 in some embodiments also provides processing related to the data stored therein.

User profile data storage 310 includes information about an individual user to facilitate the operation of system 100. User identification data storage 320 includes identifying information about the user. In some embodiments this is information provided by the user manually, while in other embodiments the user may request that such information is obtained automatically, e.g., from other facilities the user has joined or other subscriptions the user has. User interest data storage 330 keeps track of a scored or otherwise weighted list of topics that are of most interest to the user, generated as detailed below In some embodiments, index storage 340 is also provided in system database 130 for holding the index information described above in connection with indexing module 120, while in other embodiments such index information is stored directly in index module 120.

Personalized edition data storage 350 maintains the items specific to the actual personalized edition that is to be provided to the user via reader module 181. In some embodiments, this includes the results of operation of user recommendation generator 140, discussed below; in other embodiments, it also includes the actual content provided to the user.

Textual book data storage 360 and audio book storage 370 are examples of other data storage devices that store the actual content from which material is selected to be presented to the user. Only two such examples are shown here, but in many environments, additional data stores for magazine content, blogs, websites, data services and other sources of content are similarly maintained in system database 130.

In various embodiments, system database 130 includes other data as well. For example, for providers creating paid books or other content, system database 130 contains billing and revenue sharing information for the provider.

Still further, system database 130 stores synchronization information regarding different versions of electronic content (e.g., video news story and a corresponding text transcript).

In some embodiments, conventional mechanisms are used to implement many of the aspects of system database 130 and the other systems, subsystems and modules discussed herein. For example, the existing mechanisms from Google Inc.'s BOOKS™, GOGGLES™, GMAIL™, BUZZ™ CHAT™, TALK™, ORKUT™, CHECKOUT™, YOU-TUBE™, SCHOLAR™, BLOGGER™, GOOGLE+™ and other products include aspects (e.g., Bigtable key-value database mechanisms) that can help to implement one or more of storage facilities 310, 320, 330, 340, 350, 360 and 370 as well as modules 220, 230, 240, 250, and 260. Google Inc. already provides eBook readers for ANDROID™ devices (phones, tablets, etc.), iOS devices (iPhones®, iPads® and other devices from Apple, Inc.) and various desktop Web browsers, and in one embodiment GOOGLE PLAY EBOOKS™ and GOOGLE PLAY BOOKSTORE™ eBook-related applications and facilities provide infrastructure to support the functionality described herein.

User profile data storage 310 is usable on a per-reader basis and is also capable of being aggregated for various populations of users (or, more accurately for some implementations, subscribers). The population can be the entire subscriber population, or any selected subset thereof. System-wide usage data includes trends and patterns in usage habits for any desired population. In one embodiment, when a user obtains a new magazine subscription, such data are used to recommend other related items the user might also be interested in obtaining Valuation of items, relative rankings of items, and other synthesized information can also be obtained from such data.

Computing Machine Architecture

FIG. 4 is a block diagram illustrating components of an example machine able to read instructions from a machine-readable medium and execute those instructions in a processor. Specifically, FIG. 4 shows a diagrammatic representation of a machine in the example form of a computer system 400 within which instructions 424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include graphics display unit 410 (e.g., a plasma display panel (PDP), a liquid crystal display (LCD), a projector, or a cathode ray tube (CRT)). The computer system 400 may also include alphanumeric input device 412 (e.g., a keyboard), a cursor control device 414 (e.g., a mouse, a trackball, a joystick, a motion sensor, or other pointing instrument), a data store 416, a signal generation device 418 (e.g., a speaker), an audio input device 426 (e.g., a microphone) and a network interface device 420, which also are configured to communicate via the bus 408.

The data store 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network (not shown) via network interface 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Methods of Operation

The process of creating personalized multimedia magazines opens up potential user experiences that have not been available in the world of paper books and magazines.

Operation of the various components of content hosting system 110 has largely been described above in connection with the textual description of those components. Operation of user profile manager 150 to determine reading interests is separately described now for purposes of additional clarity.

Figure 5:
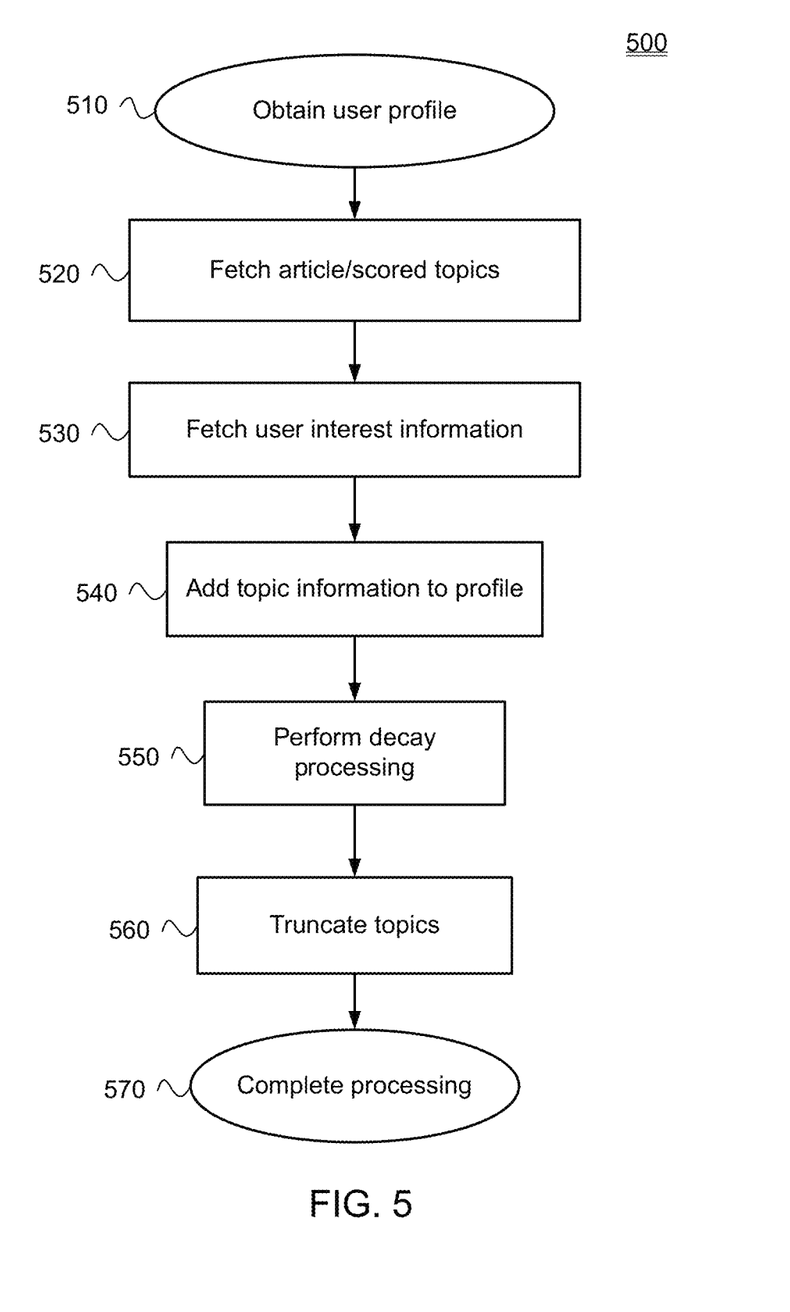
FIG. 5 illustrates one exemplary method of determining reading interests of a particular user.

Referring now to FIG. 5, there is shown one embodiment of a method 500 to determine reading interests of a particular user. It should be noted that similar techniques can be applied to determine reading interests of certain groups of users, as well, which can then be applied to individuals in that group or to individuals having characteristics similar to those in the group. In the example illustrated in FIG. 5, processing begins at step 510 by obtaining a profile corresponding to a user. This profile includes information relating to the user, such as self-identified interests and, if the user has so authorized, automatically stored information relevant to the user's interests, such as historical information on books and magazines the user has purchased and articles the user has read. In one embodiment, when a user opens a mobile application or web service (such as Google Play Newsstand), method 500 obtains 510 relevant profile information (e.g., user ID, ID of the article being opened, and current time for initial processing and scored list of user interests for later processing). For offline access, information about which article is being opened and the time of access is stored and sent to user profile manager 150 the next time the user comes online.

At step 520, user profile manager fetches the article from system database 130 and obtains the scored topics that were generated for that article as detailed above. Then, at step 530, the user's interest information is fetched. This may be done from the profile information previously obtained at step 510, or a new request for just this aspect of profile information may be made, depending on the environment of use and which technique is most efficient. The interest information from the profile may be empty (e.g., for a new user) or may include both user statistics (last update time/counter information) and a collection of scored topics. Each scored topic includes a topic ID, a score for the topic for this particular user, and time/counter information for this topic for this user.

Next, all of the topics from the article are added to the user's profile (with the score for that topic) at step 540 as follows. If the user's profile already contains a topic, the score for that topic is increased using a pre-defined mathematical function. In one embodiment, a user's score for a particular topic is incremented by an appropriate amount whenever a user reads an article corresponding to the topic. Continuing the O'Hare example mentioned previously, the user's O'Hare score may currently be 10; if the user reads an article having an O'Hare topic score of 0.5, the user's new score for O'Hare is incremented to be 10.5. If the profile does not already contain the topic, a new scored topic is added to the profile in a similar manner. In this step, a last update time for the topic is set to the current time, and a counter for the topic is incremented; a last update time for the profile is also updated, and a counter for the profile is also incremented. In some embodiments, one or more of the counters is not incremented if the last update was very recent, so that all updates happening within a certain time period (e.g., a day) are treated as one.

Periodically, scores of topics in the profile are decayed 550 using a pre-defined decay function; in one embodiment exponential decay is used to appropriately allow the user's old interests to phase out and newer interests to be ranked higher. By comparing the last update counter of a topic with the last update counter of the profile, it is known how many times the user has read content that was not related to the current topic. Thus, "stale" topics are demoted over time. While step 550 is shown in this embodiment as being performed in connection with a profile update, in other embodiments decay processing is performed independent of any particular update, for instance at a time when processing resources are more available (e.g., periodically during a time of day with low processing usage). In step 560, low-scoring topics are truncated, i.e., removed from the user's profile. This is helpful in reducing processing overhead. Processing for this method is then complete 570.

In some embodiments, multiple profiles are generated for a user to improve performance of system 100. For instance, monthly profiles are created in one embodiment to give of view of topics that are most interesting to the user at a particular time of year. While water skiing may drop off the user's profile in autumn, it may become important again next May, and use of such multiple profiles for a particular user allows recurring interests to be captured. Likewise, separate profiles for various categories may be maintained for each user, to better keep track of topics of interest to the user. For example, a separate profile for a user regarding presidential elections that would otherwise be subject to decay processing 550 will be maintained over a several year period. The scored topics thus generated for each profile are then used to generate recommendations or score search results as described elsewhere herein.

Figure 6:
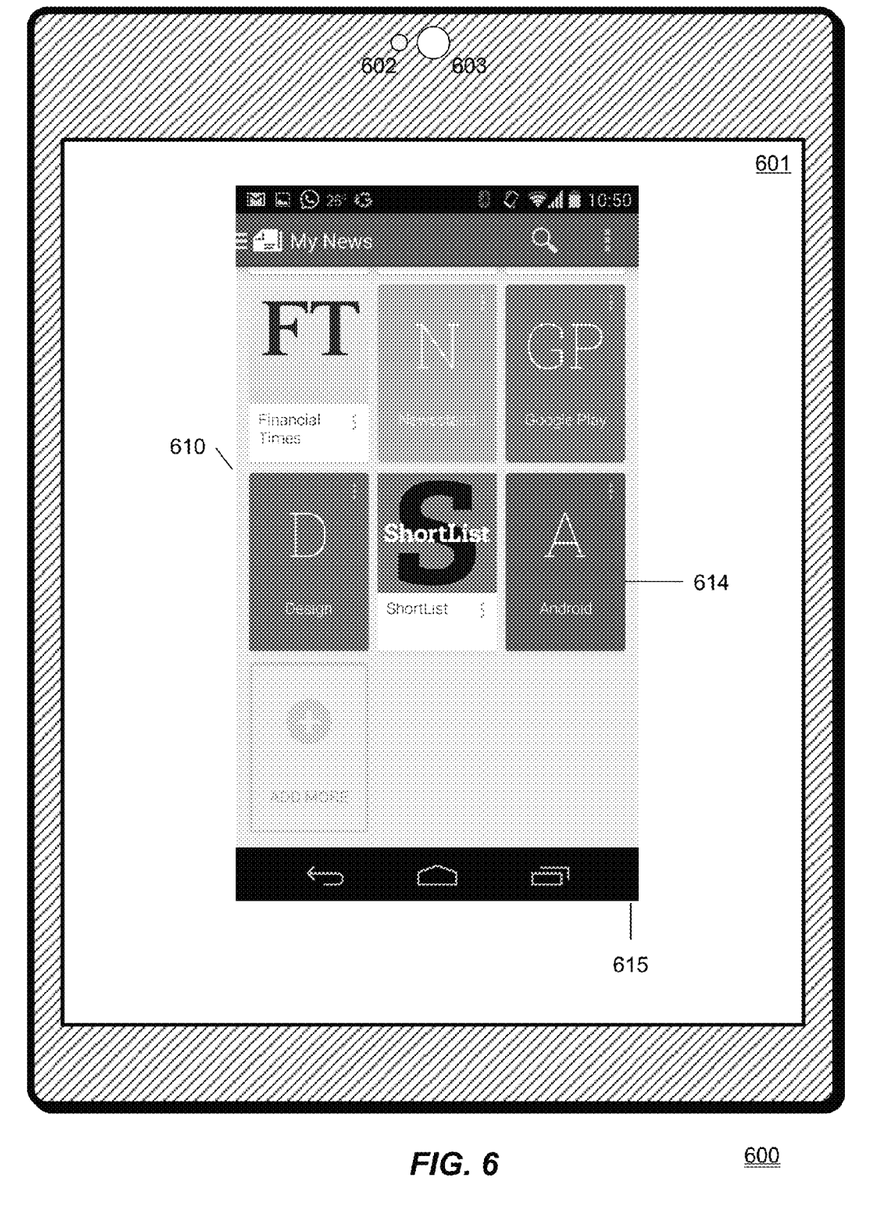
FIG. 6 illustrates a computer configured for presentation of a personalized electronic magazine.

Referring now to FIG. 6, there is shown one embodiment of a portable computer device 600 (e.g., a tablet computer running the ANDROID™ operating system) with a display screen 601, a microphone 602, and a speaker 603, configured to allow presentation of an electronic magazine, as described herein. Screen 601 provides visual display, for instance of a magazine article or of images or videos provided as part of a personalized electronic magazine. Microphone 602 provides, in certain embodiments, hands-free user control of device 600 via voice recognition. Speaker 603 provides audio output for the audio or video content.

Device 600 is shown in FIG. 6 displaying on screen 601 a user interface for one embodiment a personalized electronic magazine. The user interface illustrated in FIG. 6 is for "My News," which in this embodiment is a collection of a user's subscriptions, or in other words the user's library, that contains links to editions and topics. In this embodiment, a user interface display 610 of editions and topics (e.g., "Android" 614) is provided for the user to select content as desired. A control bar 615 below the topics provides the user with navigation options. In addition, the topic/edition icons (e.g., Android 614) in some embodiments include navigation indicators, e.g., vertically aligned dots. In one embodiment, each topic is provided with a distinctive color and background image so that the user is kept aware of what topics are associated with the user's interests. For example, display 610 in one embodiment displays the "Android" topic in brown; in other embodiments a subtle image of a corresponding image is provided to further suggest the topic. In one embodiment, such color-coding is maintained in a consistent manner among screens, to help a user quickly identify topics to which the user is subscribed.

Figure 7A:
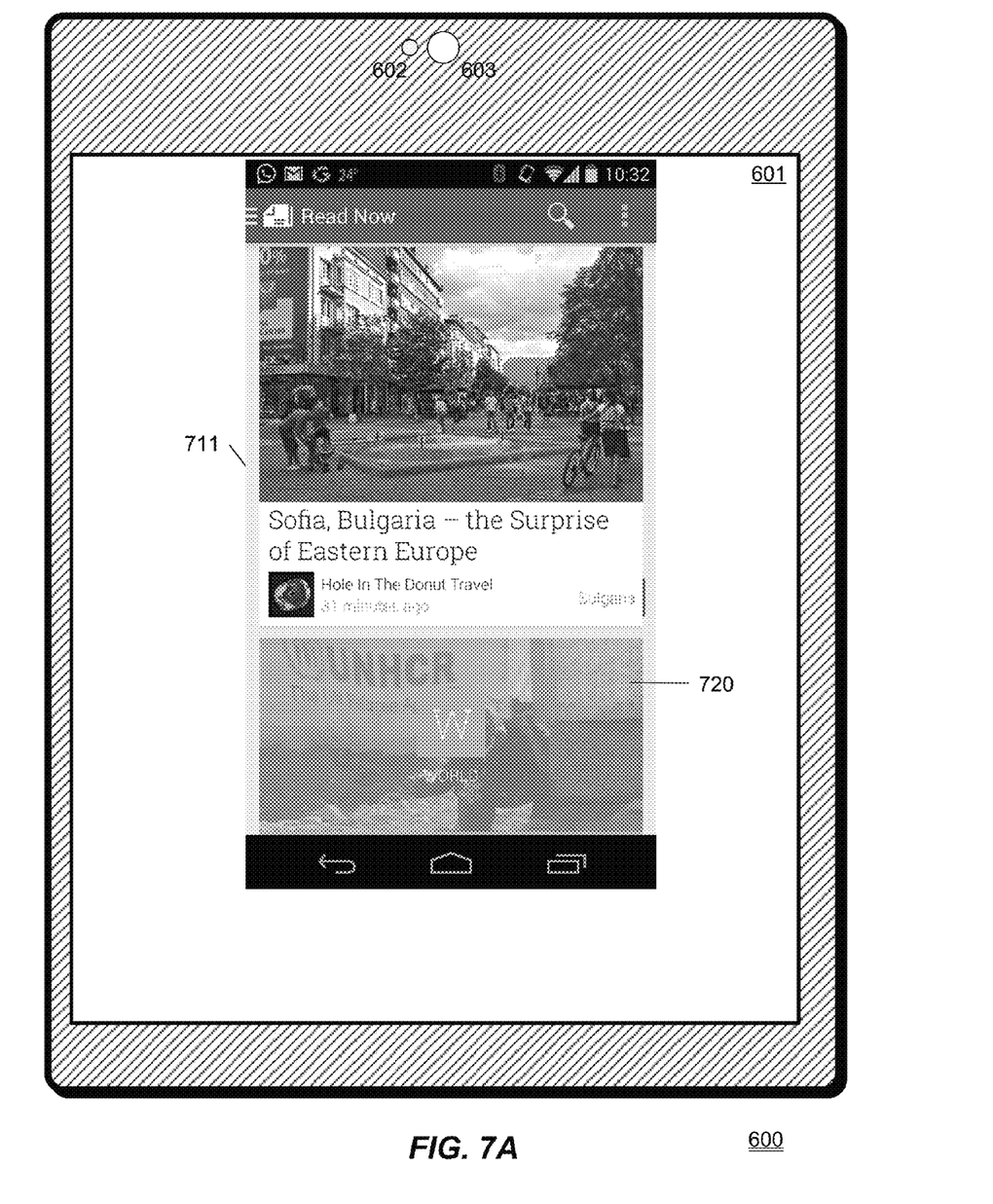
FIGS. 7A-C illustrates "Read Now" displays for the computer of FIG. 6.
Figure 7B:
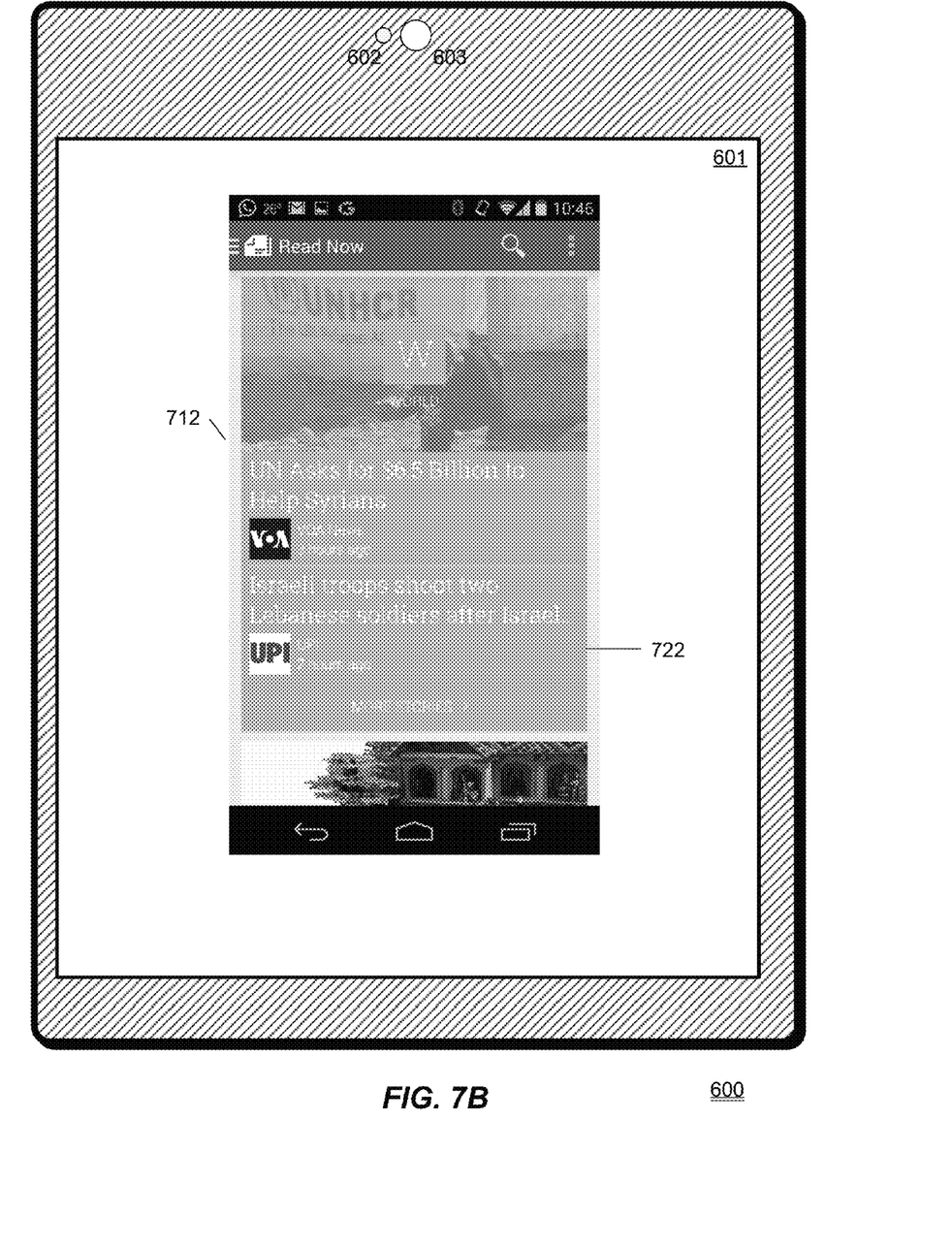
Figure 7C:
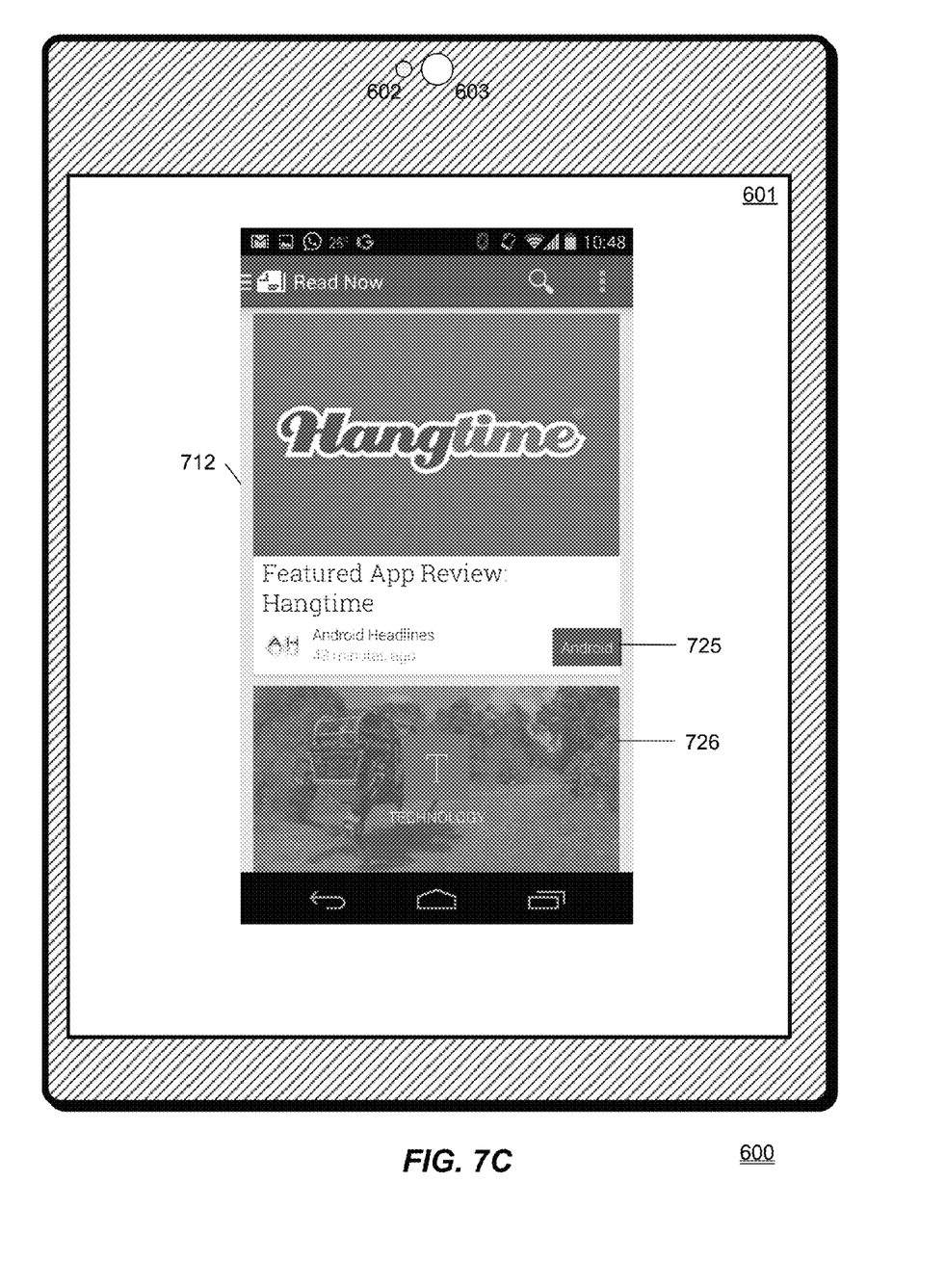

Referring now to FIGS. 7A-C, device 600 with various "Read Now" displays 711-713 are illustrated. The Read Now displays 711-713 provide the actual content of the personalized electronic magazines, and specifically "cards" (e.g., 720) for editions, articles and topics. In some embodiments, topic cards contain multiple stories about the topic that are relevant to the user. Thus, display 711 in FIG. 7A includes a link to a story about Sofia, Bulgaria as well as a link to the topic "World" to which the user has subscribed (and in one embodiment, illustrated with an icon having a yellow color scheme and a subtle image suggestive of the topic). Likewise, display 712 in FIG. 7B includes links 722 to stories related to the topic "World," again in the same color scheme. Similarly, display 713 in FIG. 7C displays content relating to a review of a featured application, as well as a related button 725 to link to the "Android" topic (in one embodiment presented in brown for consistency). Display 713 further includes a large icon 726 for the "Technology" topic (in one embodiment presented in blue, with an appropriate subtle background image) to allow the user to select content related to that topic.

Figure 8:
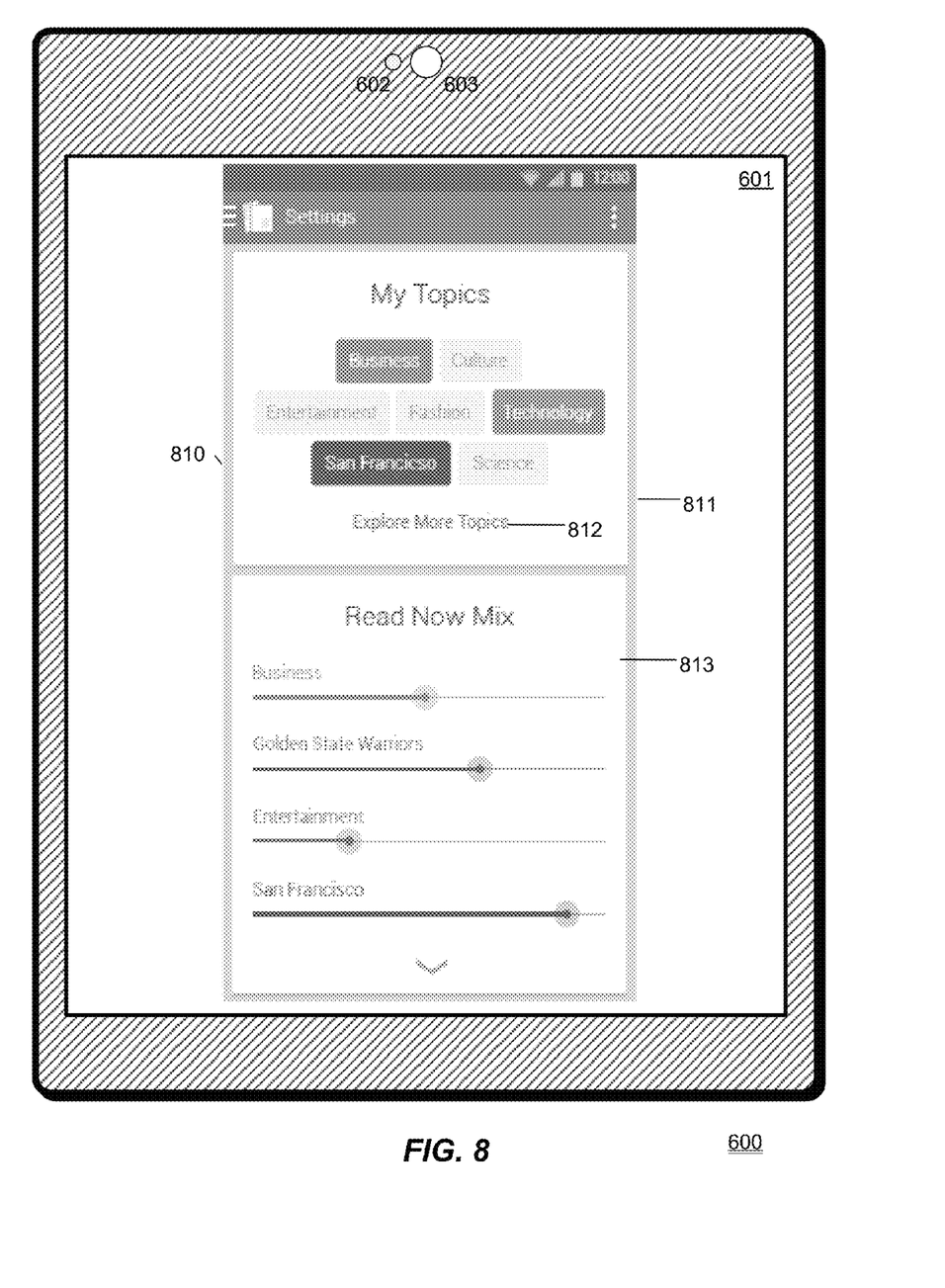
FIG. 8 illustrates a topic selection and topic mix display for the computer of FIG. 6.

Referring now to FIG. 8, device 600 with a topic display 810 is illustrated. In this portion of the user interface for a personalized electronic magazine, various topics associated with the user are displayed. Those topics a user is subscribed to are displayed in color (e.g., Technology 811 being displayed in blue and San Francisco in red) while topics the user is not subscribed to are displayed without color (e.g., in grayscale). Topic display 810 as illustrated in FIG. 8 also includes a prompt 812 for the user to select more topics. Further, topic display 810 in this embodiment includes a visual indication 813 of how the stories in the current edition of the personalized magazine relate to the user's topics. In some embodiments, visual indication 813 is not merely a display, but a control to allow the user to manually increase or decrease the desired mix for each topic, for instance via a slider control.

In some embodiments, advertising is embedded in various of the user interface screens, as may be desired in any particular implementation. In some embodiments, content is presented in a plural number of sets, so that a mix of articles relating to the user's topics of interest is presented in a first display (e.g., display 610), and then after a user action (e.g., a vertical finger swipe), a second mix of such articles is presented, thus allowing the user to quickly scan among a number of stories without having to first select a particular topic as is conventionally the case with news websites or electronic newspapers/magazines.

Generally speaking, the embodiments discussed above permit enhancement of a user experience with electronic media by automatically identifying topics likely to be of interest to a user and generating a personalized electronic magazine of articles and other content, all using existing computing devices such as smart phones and electronic book readers.

It should be noted that although the discussion herein has centered on creation and presentation of a personalized electronic magazine, those skilled in the art will readily recognize that these techniques can be used to facilitate other possible content delivery involving electronic media as well. For instance, a business user such as an office machine technician may have service manuals and bulletins automatically provisioned to a user computer 180 based on review of the technician's use of related resources and or activities (e.g., a service call calendar item identifying a particular office machine model known to have a particularly likely service problem).

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for provision of a personalized electronic magazine through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An electronic magazine system, comprising:
   a processor; and
   a non-transitory computer readable medium storing instructions, the instructions when executed by the processor cause the processor to:
      accept, as input, content items;
      establish correspondences between individual ones of the content items and individual ones of a plurality of available topics;
      generate a plurality of profile topics responsive to automatically determined interests of a user;
      select magazine items from the content items responsive to correspondence between the available topics and the profile topics;
      assign scores to the profile topics, each of the scores assigned to a corresponding topic of the profile topics, each of the scores assigned based on a number of times that the user has consumed content items corresponding to one of the profile topics over a time period;
      periodically update the scores by decaying the scores using a pre-defined decay function to produce updated scores;
      compare the updated scores to determine a stale topic from the profile topics, the stale topic having a lower score than other topics from the profile topics; and
      remove the stale topic from the profile topics.

2. The system of claim 1, wherein the instructions when executed by the processor further cause the processor to manage how many of the content items are identified as corresponding to each of the plurality of available topics.

3. The system of claim 1, wherein the instructions when executed by the processor further cause the processor to ensure that the magazine items are selected so as to provide sufficient representation of each of the profile topics.

4. The system of claim 1, wherein the instructions when executed by the processor further cause the processor to maintain multiple profiles for the user.

5. The system of claim 4, wherein the multiple profiles relate to differing time periods.

6. The system of claim 4, wherein the multiple profiles relate to differing user interest areas.

7. The system of claim 1, wherein the instructions when executed by the processor further cause the processor to:
limit a number of content items presented for one of the profile topics by:
determining two content items of the one of the profile topics having a similarity score over a predetermined threshold; and
rejecting display of one of the two content items having the similarity score over the predetermined threshold.

8. The system of claim 7, wherein the number of the content items presented for the one of the profile topics is determined based on weights of the profile topics, each of the weights assigned to a corresponding one of the profile topics.

9. The system of claim 8, wherein the weights are adjustable through a user interface.

10. The system of claim 1, wherein the instructions when executed by the processor further cause the processor to:
generate output content items for presentation by a client computer based on the profile topics.

11. The system of claim 10, wherein the output content items are divided into a plurality of sets including a first set of output content items and a second set of output content items, the second set of output content items displayed, by the client computer, after the first set of output content items.

12. A computer-implemented method of providing a personalized electronic magazine to a user, comprising:
establishing correspondences between individual ones of a plurality of content items and individual ones of a plurality of available topics;
generating a plurality of profile topics responsive to automatically determined interests of the user;
automatically selecting magazine items from the content items responsive to correspondence between the available topics and the profile topics;
assigning scores to the profile topics, each of the scores assigned to a corresponding topic of the profile topics, each of the scores assigned based on a number of times that the user has consumed content items corresponding to one of the profile topics over a time period;
periodically updating the scores by decaying the scores using a pre-defined decay function to produce updated scores;
comparing the updated scores to determine a stale topic from the profile topics, the stale topic having a lower score than other topics from the profile topics; and
removing the stale topic from the profile topics.

13. The computer-implemented method of claim 12, further comprising managing how many of the content items are identified as corresponding to each of the plurality of available topics.

14. The computer-implemented method of claim 12, wherein the automatically selecting includes rejection and re-selection of candidate items so as to provide sufficient representation of each of the profile topics.

15. The computer-implemented method of claim 12, further comprising maintaining multiple profiles for the user.

16. The computer-implemented method of claim 15, wherein the multiple profiles relate to differing time periods.

17. The computer-implemented method of claim 15, wherein the multiple profiles relate to differing user interest areas.

18. A non-transitory computer-readable storage medium storing executable computer program code for providing a personalized electronic magazine to a user, the computer program code comprising instructions for:
establishing correspondences between individual ones of a plurality of content items and individual ones of a plurality of available topics;
generating a plurality of profile topics responsive to automatically determined interests of the user;
automatically selecting magazine items from the content items responsive to correspondence between the available topics and the profile topics;
assigning scores to the profile topics, each of the scores assigned to a corresponding topic of the profile topics, each of the scores assigned based on a number of times that the user has consumed content items corresponding to one of the profile topics over a time period;
periodically updating the scores by decaying the scores using a pre-defined decay function to produce updated scores;
comparing the updated scores to determine a stale topic from the profile topics, the stale topic having a lower score than other topics from the profile topics; and
removing the stale topic from the profile topics.

19. The non-transitory computer-readable storage medium of claim 18, further comprising instructions for managing how many of the content items are identified as corresponding to each of the plurality of available topics.

20. The non-transitory computer-readable storage medium of claim 18, wherein the instructions for automatically selecting further comprise instructions for rejection and re-selection of candidate items so as to provide sufficient representation of each of the profile topics.

21. The non-transitory computer-readable storage medium of claim 18, further comprising instructions for maintaining multiple profiles for the user.

* * * * *